(12) United States Patent
Lambert et al.

(10) Patent No.: US 11,409,686 B1
(45) Date of Patent: Aug. 9, 2022

(54) SYSTEMS AND METHODS FOR FLOATING PADDLE CARD ENABLEMENT

(71) Applicant: Dell Products L.P., Round Rock, TX (US)

(72) Inventors: Timothy M. Lambert, Austin, TX (US); Jeffrey L. Kennedy, Austin, TX (US); Nihit S. Bhavsar, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 36 days.

(21) Appl. No.: 17/154,836

(22) Filed: Jan. 21, 2021

(51) Int. Cl.
*G06F 13/40* (2006.01)
*G06F 1/12* (2006.01)
*G06F 1/26* (2006.01)
*G06F 11/14* (2006.01)
*G06F 13/10* (2006.01)
*G06F 13/12* (2006.01)

(52) U.S. Cl.
CPC .............. *G06F 13/405* (2013.01); *G06F 1/12* (2013.01); *G06F 1/26* (2013.01); *G06F 1/266* (2013.01); *G06F 11/1417* (2013.01); *G06F 13/102* (2013.01); *G06F 13/12* (2013.01); *G06F 13/409* (2013.01); *G06F 2201/805* (2013.01)

(58) Field of Classification Search
CPC .............. G06F 9/44; G06F 9/445; H05K 7/00
See application file for complete search history.

(56) References Cited

U.S. PATENT DOCUMENTS

| | | | |
|---|---|---|---|
| 2009/0177500 A1* | 7/2009 | Swahn | G06Q 40/08 705/4 |
| 2011/0087913 A1* | 4/2011 | Robles | G06F 1/3215 713/401 |
| 2013/0135813 A1* | 5/2013 | Jimenez, III | G06F 1/185 248/220.21 |
| 2014/0258740 A1* | 9/2014 | Rosenzweig | G06F 1/3203 713/300 |
| 2019/0056773 A1* | 2/2019 | Xiao | G06F 13/10 |
| 2019/0121764 A1* | 4/2019 | Regupathy | H04L 41/0853 |

* cited by examiner

*Primary Examiner* — Getente A Yimer
(74) *Attorney, Agent, or Firm* — Jackson Walker L.L.P.

(57) ABSTRACT

An information handling system may include a motherboard and a floating paddle card. The motherboard may include a host system comprising a host system processor, a logic device configured to perform a functionality of the information handling system in accordance with code stored on non-transitory computer-readable media of the logic device, and a management controller communicatively coupled to the host system processor and the logic device and configured to perform out-of-band management of the information handling system. The floating paddle card may be communicatively coupled to the motherboard and configured to serve as interface between one or more devices coupled to the floating paddle card and the logic device and the management controller, the floating paddle card comprising a microcontroller unit configured to, alone or in combination with other circuitry of the floating paddle card, divide management of the one or more devices between the motherboard and the floating paddle card.

21 Claims, 3 Drawing Sheets

SYSTEMS AND METHODS FOR FLOATING PADDLE CARD ENABLEMENT

TECHNICAL FIELD

The present disclosure relates in general to information handling systems, and more particularly to systems and methods for enabling a floating paddle card in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Rise cards or floating paddle cards are often used in information handling systems to extend a mechanical and electrical interface of a motherboard or other printed circuit board to multiple peripheral components (e.g., to a mezzanine network interface card). In many known platforms, the physical location of a card that is compliant with the Open Compute Platform (OCP) specification is restricted to a fixed mating connector on a motherboard or other printed circuit board. As a result, using traditional approaches, a quantity of OCP cards (e.g., OCP network interface cards) supported in a platform may be limited to fixed connector placements with parallel input/output for management of the cards.

SUMMARY

In accordance with the teachings of the present disclosure, the disadvantages and problems associated with existing limitations to mezzanine cards may be reduced or eliminated.

In accordance with embodiments of the present disclosure, an information handling system may include a motherboard and a floating paddle card. The motherboard may include a host system comprising a host system processor, a logic device configured to perform a functionality of the information handling system in accordance with code stored on non-transitory computer-readable media of the logic device, and a management controller communicatively coupled to the host system processor and the logic device and configured to perform out-of-band management of the information handling system. The floating paddle card may be communicatively coupled to the motherboard and configured to serve as interface between one or more devices coupled to the floating paddle card and the logic device and the management controller, the floating paddle card comprising a microcontroller unit configured to, alone or in combination with other circuitry of the floating paddle card, divide management of the one or more devices between the motherboard and the floating paddle card.

In accordance with these and other embodiments of the present disclosure, a method may be for use in an information handling system comprising a motherboard having a host system comprising a host system processor, a logic device configured to perform a functionality of the information handling system in accordance with code stored on non-transitory computer-readable media of the logic device, and a management controller communicatively coupled to the host system processor and the logic device and configured to perform out-of-band management of the information handling system. The method may include dividing, between the motherboard and a floating paddle card communicatively coupled to the motherboard and configured to serve as interface between one or more devices coupled to the floating paddle card and the logic device and the management controller, management of the one or more devices between the motherboard and the floating paddle card.

In accordance with these and other embodiments of the present disclosure, an article of manufacture may include a non-transitory computer-readable medium and computer-executable instructions carried on the computer-readable medium, the instructions readable by a processing device, the instructions, when read and executed, for causing the processing device to, in an information handling system comprising a motherboard having a host system comprising a host system processor, a logic device configured to perform a functionality of the information handling system in accordance with code stored on non-transitory computer-readable media of the logic device, and a management controller communicatively coupled to the host system processor and the logic device and configured to perform out-of-band management of the information handling system: divide, between the motherboard and a floating paddle card communicatively coupled to the motherboard and configured to serve as interface between one or more devices coupled to the floating paddle card and the logic device and the management controller, management of the one or more devices between the motherboard and the floating paddle card.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
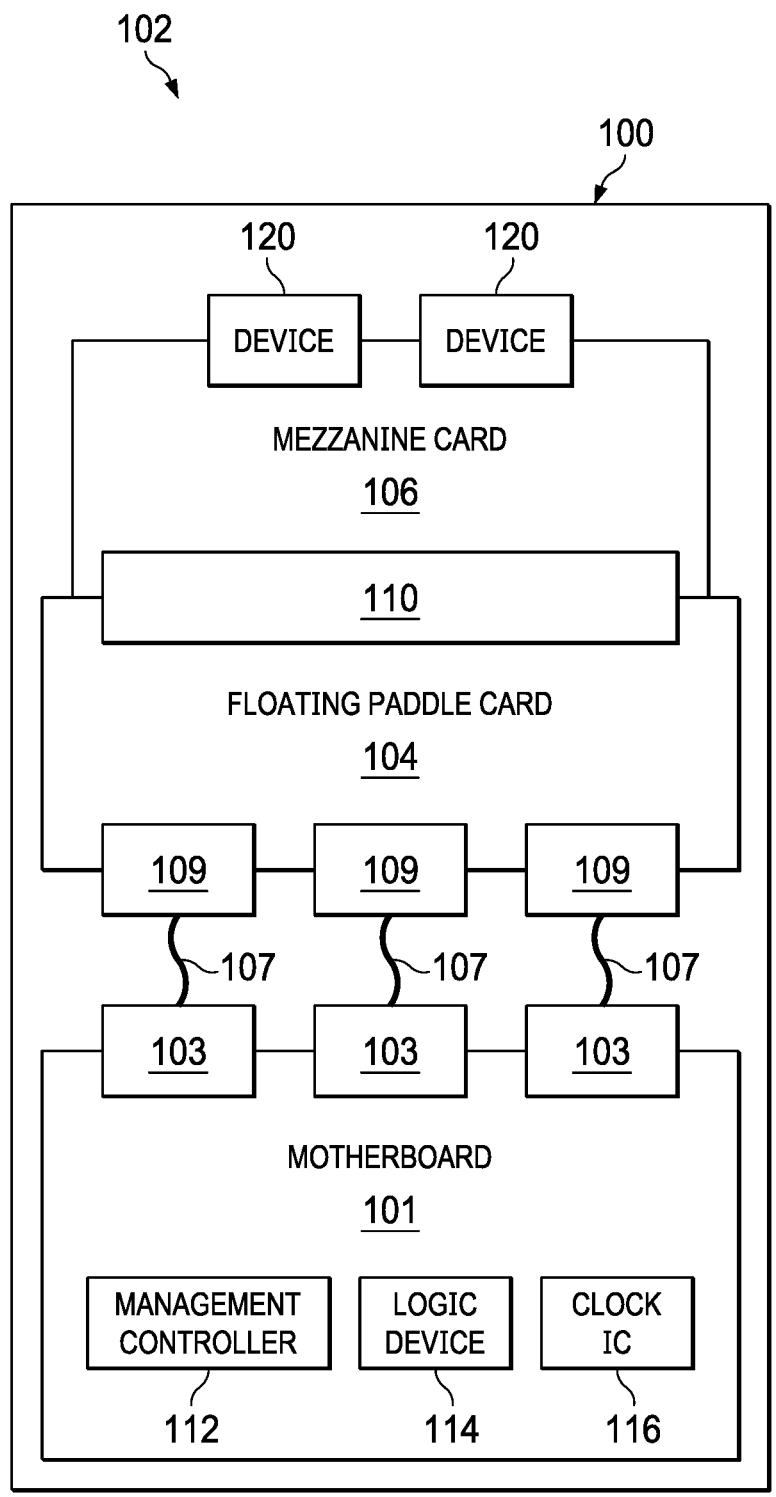
FIG. 1 illustrates a block diagram an example information handling system, in accordance with embodiments of the present disclosure.
Figure 2A:
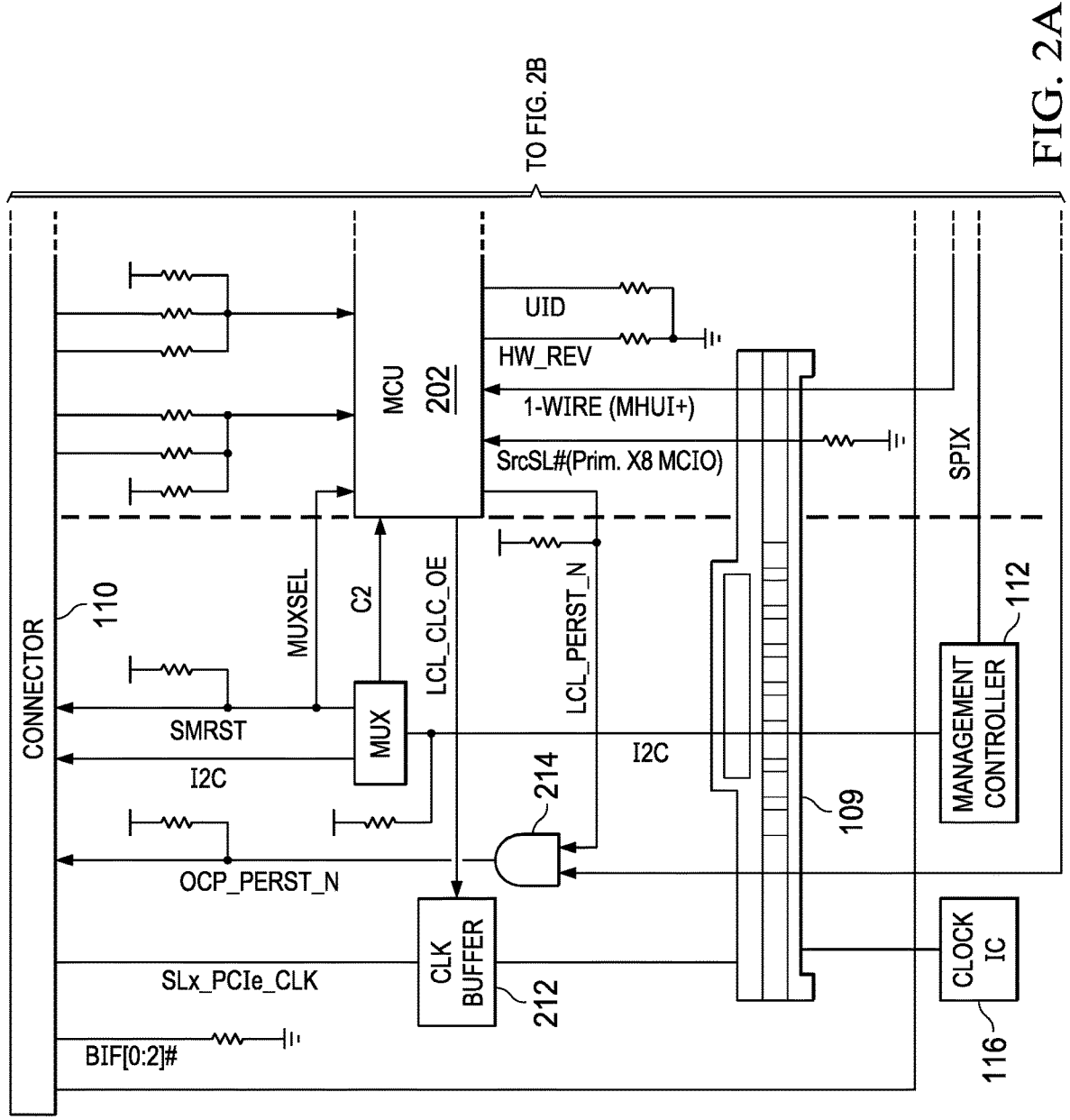
FIGS. 2A and 2B (which are referred to collectively herein as "FIG. 2") illustrate a circuit diagram of selected components of an example mezzanine card and connectivity to selected components of a motherboard, in accordance with embodiments of the present disclosure.
Figure 2B:
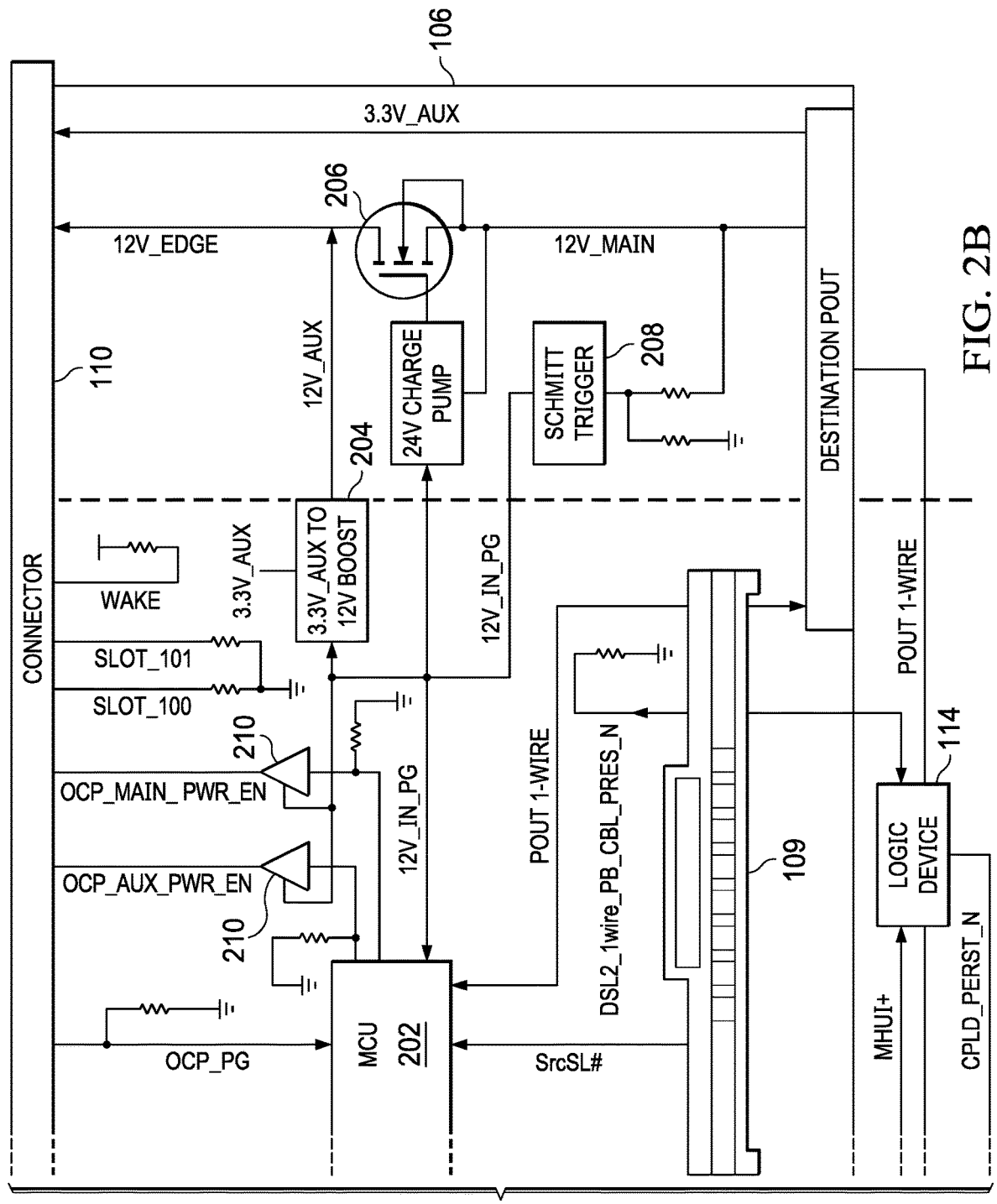

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electro-magnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

FIG. 1 illustrates a block diagram of an example information handling system 102, in accordance with embodiments of the present disclosure. As depicted, information handling system 102 may include a chassis 100, a motherboard 101, a floating paddle card 104 mechanically and communicatively coupled to motherboard 101, a mezzanine card 106 mechanically and communicatively coupled to floating paddle card 104 (e.g., such that floating paddle card 104 is interfaced between mezzanine card 106 and motherboard 101), and one or more other information handling resources.

Chassis 100 may be an enclosure that serves as a container for various information handling resources, and may be constructed from steel, aluminum, plastic, and/or any other suitable material. Although the term "chassis" is used, chassis 100 may also be referred to as a sled, case, cabinet, tower, box, enclosure, and/or housing.

Motherboard 101 may include a circuit board mechanically coupled to chassis 100 (e.g., via screws, fasteners, and/or any other mechanical mechanism) and configured to provide structural support for one or more information handling resources of information handling system 102 and/or electrically couple one or more of such information handling resources to each other and/or to other electric or electronic components external to information handling system 102. For example, motherboard 101 may include one or more processors, one or more memories, and one or more other information handling resources. As specific examples, motherboard 101 may include a management controller 112, a logic device 114, and a clock integrated circuit (IC) 116.

Management controller 112 may be configured to provide management facilities for management of information handling system 102. Such management may be made by management controller 112 even if information handling system 102 is powered off or powered to a standby state. In certain embodiments, management controller 112 may include or may be an integral part of a baseboard management controller (BMC) or a remote access controller (e.g., a Dell Remote Access Controller or Integrated Dell Remote Access Controller). In these and other embodiments, management controller 112 may be referred to as a service processor or access controller.

Logic device 114 may comprise any suitable system, device, or apparatus that may perform a specialized function that extends the functionality of information handling system 102. For example, logic device 114 may serve as an interface between management controller 112 and subsystems of information handling system 102 for communication of control information associated with such subsystems. In some embodiments, logic device 114 may comprise a complex programmable logic device (CPLD) or a field-programmable gate array (FPGA).

Clock IC 116 may comprise any system, device, or apparatus for generating a clock signal or other synchronization signal for synchronous digital circuits or components of information handling system 102.

Further, motherboard 101 may have mounted thereon one or more cable connectors 103 electrically-conductive features (e.g., pins) for receiving a corresponding cable 107 thus electrically coupling electrically conductive wires of cable 107 to corresponding electrically-conductive features of cable connectors 103 and electrically coupling an floating paddle card 104 to receptacle connectors 103 such that floating paddle card 104 is electrically and communicatively coupled to motherboard 101.

Floating paddle card 104 may comprise a printed circuit board configured to receive a multitude of signal lines (e.g., bused signal lines) or power lines via a one or more cables (e.g., cables 107) from motherboard 101 and distribute such signal lines via dedicated connectors (e.g., cable connectors 109) mounted on floating paddle card 104. As described in greater detail below, floating paddle card 104 may be configured to, in concert with management controller 112, divide management of a mezzanine card 106 coupled to floating paddle card 104 via a connector 110 and of devices 120 (e.g., PCIe cards) coupled to mezzanine card 106 between floating paddle card 104 and motherboard 101.

Mezzanine card 106 may comprise a printed circuit board configured to receive a multitude of signal lines (e.g., bused signal lines) via a one or more connectors (e.g., edge connector 110) from floating paddle card 104 and distribute such signal lines via dedicated connectors (e.g., receptacle connectors) mounted on mezzanine card 106 for receiving devices 102. Thus, mezzanine card 106 may enable the addition of expansion cards (e.g., PCIe cards). As shown in FIG. 1, mezzanine card 106 may plug into floating paddle card 104 (e.g., via edge connector 110) and may provide additional slots, for example via receptacle connectors mounted to mezzanine card 106, for one or more other devices (e.g., PCIe and/or other adapter cards). Accordingly, each receptacle connector of mezzanine card 106 may be configured to receive a corresponding edge connector of a device 120 (e.g., PCIe and/or other adapter card).

In the context of OCP mezzanine card, an application-specific integrated circuit (ASIC) (e.g., an Ethernet Media Access Control device) may be a PCIe endpoint on mezzanine card 106. In such context, devices 120 may be network interface transceivers.

In addition to motherboard 101, floating paddle card 104, and mezzanine card 106, information handling system 102 may include one or more other information handling resources.

FIG. 2 illustrates a circuit diagram of selected components of an example floating paddle card 104 and electrical connectivity of selected components of motherboard 101, in accordance with embodiments of the present disclosure.

One feature of floating paddle card 104 may include power control. For example, floating paddle card 104 may include a boost converter 204 for boosting an auxiliary source voltage (e.g., power rail 3.3V_AUX shown in FIG. 2, having a voltage of 3.3 V) to a boosted rail voltage (e.g., power rail 12V_EDGE shown in FIG. 2, having a voltage of 12V, via power line 12V_AUX shown in FIG. 2) when information handling system 102 is in a low-power state (e.g., power state S5 or "off"). The power rail 12V_EDGE may be gated with a main power source (e.g., power rail 12V_MAIN) via a transistor 206, which provide power rail 12V_EDGE during runtime of a host system of information handling system 102 (e.g., power state S0). A Schmitt trigger 208 may implement hysteresis of such voltages and shape slow edges of waveforms that may occur due to voltage divider resistance. Further, floating paddle card 104 may include a microcontroller unit (MCU) 202 or other processing device configured to perform various functionality of floating paddle card 104, including providing staggered power on of devices coupled to receptacle connector 110 (e.g., based on source power out identifiers) in order to avoid a system-wide inrush of current, while tristate buffers 210 of floating paddle card 104 may remove a dependency of devices coupled to receptacle connector 110 and may instantly power down devices coupled to receptacle connector 110 when appropriate.

Another feature of floating paddle card 104 may include clock enablement functions (e.g., enablement of Peripheral Component Interconnect Enhanced or PCIe clock). An input clock to devices coupled to receptacle connector 110 may be running freely from clock IC 116 regardless of such devices being in an identification, auxiliary, or main mode, which may violate sequencing of a given standard (e.g., OCP 3.0 specification). To enable floating paddle card 104 to comply with such standards, floating paddle card 104 may include a clock buffer 212 controlled by MCU 202, such that MCU 202 may provide control over clock signals such that the clock signal (e.g., signal SLx_PCIe_CLK) distributed to devices coupled to receptacle connector 110 is enabled only after the main power state in the power sequence.

Yet another feature of floating paddle card 104 may include management of a fundamental reset (PERST) of devices coupled to receptacle connector 110. Floating paddle card 104 may include a logical AND gate 214 configured to, in concert with MCU 202, perform management of a fundamental reset signal (e.g., signal OCP_RESET_N). According to the OCP 3.0 specification, a fundamental reset signal PERST is required to pulse during runtime of a host system of information handling system 102 after OCP main power is enabled in order for communication links (e.g. PCIe links) to train properly. Accordingly, logic device 114 may require a discrete fundamental reset control for each OCP slot. Because management controller 112 and logic device 114 do not follow a local power state of an endpoint coupled to receptacle connector 110 or provide individually controlled fundamental resets to all endpoints, MCU 202 and logical AND gate 214 may operate to allow for a fundamental reset signal (e.g., signal OCP_RESET_N) to be asserted by either of logic device 114 (e.g., via signal CPLD_PERST_N) or MCU 202 (e.g., via signal LCL_PERST_N). Thus, a fundamental reset may be asserted to a device coupled to receptacle connector 110 when either a fundamental reset from motherboard 101 or a local reset from MCU 202 is asserted.

Yet another feature of floating paddle card 104 may include power source discovery. For example, such feature may include determining which power source connector correlates to which high speed input/output data source connector for a validated configuration check. To discover which power source is connected, MCU 202 may drive low a one-wire pin (e.g., POUT 1-wire shown in FIG. 2) to signal a break to logic device 114. Upon detecting the break, logic device 114 may transmit a power source connector identifier (e.g., on MHUI+ shown in FIG. 2) to MCU 202. In response, MCU 202 may record the power source connector identifier and transmit the power source connector identifier to management controller 112, thus completing a power source verification loop. It is possible that logic device 114 could miss a break communicated from MCU 202 (e.g., due to limited resources). Accordingly, a retry/timeout period may be utilized for the break signal.

Yet another feature of floating paddle card 104 may include local power control. OCP network interface cards, which may be coupled to receptacle connector 110, are high-powered devices that may dissipate significant heat. Accordingly, before enabling devices coupled to receptacle connector 110, management controller 112 may need to check power and thermal limits associated with information handling system 102 to ensure operation of such devices can be supported. Accordingly, a power enablement control bit may be communicated from management controller 112 (e.g., on SPIX shown in FIG. 2) to logic device 114. Upon a host system of information handling system 102 entering runtime (e.g., power state S0), MCU 202 may perform an initial handshake with logic device 114, after which logic device 114 may communicate one or more control bytes (e.g., on 1_WIRE (MHUI+) shown in FIG. 2), wherein such control bytes may include the power enablement control bit and any other suitable information. Based on the power enablement control bit, MCU 202 may enable or disable power to devices coupled to connector 110.

Yet another feature of floating paddle card 104 may include startup fault handling. An OCP startup fault may occur when a threshold amount of time passes between assertion of a main power enable (MAIN_PWR_EN) signal and an OCP power good (OCP_PG) signal. An OCP startup fault may also occur when a threshold amount of time passes between assertion of an auxiliary power enable (AUX_PWR_EN) signal and an OCP power good (OCP_PG) signal. In operation, when such a startup failure occurs, MCU 202 may disable devices coupled to receptacle connector 110 and communicate status of such failure to logic device 114 via a low-latency one-wire protocol. MCU 202 may then await for the next control byte from management controller 112 and logic device 114 to again enable the devices coupled to receptacle connector 110.

Yet another feature of floating paddle card 104 may include runtime fault handling. Runtime failure may occur if an OCP power good (OCP_PG) signal is unexpectedly deasserted. Accordingly, the power good signal may be constantly monitored by MCU 202, and when a runtime fault occurs, MCU 202 may disable devices coupled to receptacle connector 110 and communicate status of such failure to logic device 114 via a low-latency one-wire protocol.

Accordingly, using the systems and methods described above, floating paddle card 104 may support a modular device (e.g., OCP 3.0 standard network interface card) via a generic high speed connector/cable. The systems and methods described above may also enable joint system and local (to MCU 202) control of fundamental reset signals. The systems and methods described above may further enable system gross command and local (to MCU 202) slot power staggering. The systems and methods described above may in addition enable localized clock control by MCU 202. The systems and methods described above may additionally provide a unique power control scheme comprised of an identification mode low power scheme (supporting OCP specification requirements of main power rail and auxiliary power rail), as well as a high power auxiliary mode or main mode switchover (e.g., with a hardware-controlled OCP power mode override).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a motherboard comprising:
      a host system comprising a host system processor;
      a logic device configured to perform a functionality of the information handling system in accordance with code stored on non-transitory computer-readable media of the logic device; and
      a management controller communicatively coupled to the host system processor and the logic device and configured to perform out-of-band management of the information handling system; and
   a floating paddle card communicatively coupled to the motherboard and configured to serve as interface between one or more devices coupled to the floating paddle card and the logic device and the management controller, the floating paddle card comprising a microcontroller unit configured to, alone or in combination with other circuitry of the floating paddle card, divide management of the one or more devices between the motherboard and the floating paddle card.

2. The information handling system of claim 1, wherein division of management of the one or more devices between the motherboard and the floating paddle card comprises jointly controlling fundamental reset of the one or more devices by the motherboard and the floating paddle card.

3. The information handling system of claim 1, wherein division of management of the one or more devices between the motherboard and the floating paddle card comprises jointly controlling a clock synchronization signal delivered to the one or more devices by the motherboard and the floating paddle card.

4. The information handling system of claim 1, wherein division of management of the one or more devices between the motherboard and the floating paddle card comprises the floating paddle card staggering the powering on of the one or more devices.

5. The information handling system of claim 1, wherein division of management of the one or more devices between the motherboard and the floating paddle card comprises the floating paddle card controlling power rails for the one or more devices over a plurality of operational modes of the one or more devices.

6. The information handling system of claim 1, wherein the division of management of the one or more devices between the motherboard and the floating paddle card comprises the floating paddle card performing power source discovery.

7. The information handling system of claim 1, wherein the division of management of the one or more devices between the motherboard and the floating paddle card comprises the floating paddle card selectively enabling the one or more devices based on a thermal configuration of the information handling system.

8. The information handling system of claim 1, wherein the division of management of the one or more devices between the motherboard and the floating paddle card comprises the floating paddle card performing startup fault handling of the one or more devices.

9. The information handling system of claim 1, wherein the division of management of the one or more devices between the motherboard and the floating paddle card comprises the floating paddle card performing runtime fault handling of the one or more devices.

10. The information handling system of claim 1, further comprising a mezzanine card interfaced between the one or more devices and the floating paddle card.

11. A method comprising, in an information handling system comprising a motherboard having a host system comprising a host system processor, a logic device configured to perform a functionality of the information handling system in accordance with code stored on non-transitory computer-readable media of the logic device, and a management controller communicatively coupled to the host system processor and the logic device and configured to perform out-of-band management of the information handling system:
dividing, between the motherboard and a floating paddle card communicatively coupled to the motherboard and configured to serve as interface between one or more devices coupled to the floating paddle card and the logic device and the management controller, management of the one or more devices between the motherboard and the floating paddle card.

12. The method of claim 11, wherein division of management of the one or more devices between the motherboard and the floating paddle card comprises jointly controlling fundamental reset of the one or more devices by the motherboard and the floating paddle card.

13. The method of claim 11, wherein division of management of the one or more devices between the motherboard and the floating paddle card comprises jointly controlling a clock synchronization signal delivered to the one or more devices by the motherboard and the floating paddle card.

14. The method of claim 11, wherein division of management of the one or more devices between the motherboard and the floating paddle card comprises the floating paddle card staggering the powering on of the one or more devices.

15. The method of claim 11, wherein division of management of the one or more devices between the motherboard and the floating paddle card comprises the floating paddle card controlling power rails for the one or more devices over a plurality of operational modes of the one or more devices.

16. The method of claim 11, wherein the division of management of the one or more devices between the motherboard and the floating paddle card comprises the floating paddle card performing power source discovery.

17. The method of claim 11, wherein the division of management of the one or more devices between the motherboard and the floating paddle card comprises the floating paddle card selectively enabling the one or more devices based on a thermal configuration of the information handling system.

18. The method of claim 11, wherein the division of management of the one or more devices between the motherboard and the floating paddle card comprises the floating paddle card performing startup fault handling of the one or more devices.

19. The method of claim 11, wherein the division of management of the one or more devices between the motherboard and the floating paddle card comprises the floating paddle card performing runtime fault handling of the one or more devices.

20. The method of claim 11, wherein a mezzanine card is interfaced between the one or more devices and the floating paddle card.

21. An article of manufacture comprising:
a non-transitory computer-readable medium; and
computer-executable instructions carried on the computer-readable medium, the instructions readable by a processing device, the instructions, when read and executed, for causing the processing device to, in an information handling system comprising a motherboard having a host system comprising a host system processor, a logic device configured to perform a functionality of the information handling system in accordance with code stored on non-transitory computer-readable media of the logic device, and a management controller communicatively coupled to the host system processor and the logic device and configured to perform out-of-band management of the information handling system:
divide, between the motherboard and a floating paddle card communicatively coupled to the motherboard and configured to serve as interface between one or more devices coupled to the floating paddle card and the logic device and the management controller, management of the one or more devices between the motherboard and the floating paddle card.

* * * * *